United States Patent
Yahata

(10) Patent No.: US 12,482,147 B2
(45) Date of Patent: Nov. 25, 2025

(54) ELECTRONIC DEVICE AND METHOD OF IMAGE PROCESSING

(71) Applicant: SK hynix Inc., Icheon-si (KR)

(72) Inventor: Kazuhiro Yahata, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 248 days.

(21) Appl. No.: 18/352,943

(22) Filed: Jul. 14, 2023

(65) Prior Publication Data
US 2024/0273781 A1   Aug. 15, 2024

(30) Foreign Application Priority Data

Feb. 14, 2023   (KR) .................. 10-2023-0019062

(51) Int. Cl.
*G06T 11/00*     (2006.01)
*G06T 3/40*      (2024.01)
(Continued)

(52) U.S. Cl.
CPC .............. *G06T 11/001* (2013.01); *G06T 3/40* (2013.01); *G06T 7/40* (2013.01); *G06T 7/90* (2017.01); *G06T 2207/10024* (2013.01)

(58) Field of Classification Search
CPC . G06T 11/001; G06T 7/90; G06T 7/40; G06T 3/40–41; G06T 3/4007;
(Continued)

(56) References Cited

U.S. PATENT DOCUMENTS 11,491,395 B1 * 11/2022 Kumar .................. A63F 13/212
11,731,041 B1 *  8/2023 Kumar .................. A61H 23/02
                                                    345/8
(Continued)

FOREIGN PATENT DOCUMENTS

KR   1020140055503 A    5/2014
KR   1020210121508 A   10/2021
WO      2016026072 A1    2/2016

OTHER PUBLICATIONS

Chiman Kwan et al., "Demosaicing of CFA 3.0 with Applications to Low Lighting Images", Sensors, Jun. 17, 2020.
(Continued)

*Primary Examiner* — Wesner Sajous
(74) *Attorney, Agent, or Firm* — WILLIAM PARK AND ASSOCIATES LTD.

(57) ABSTRACT

Provided herein is an electronic device and a method of image processing. An electronic device may include an image sensor configured to obtain image data including color pixel values and texture pixel values using color pixels and texture pixels, a resolution converter configured to generate two or more images having different sizes based on the image data, a parameter calculator configured to acquire two or more parametric images, respectively corresponding to the two or more images, using converted color pixel values and converted texture pixel values that are included in each of the two or more images, a parameter synthesizer configured to acquire a synthesized parametric image by synthesizing the two or more parametric images, and an image acquirer configured to acquire an output image based on the synthesized parametric image and the texture pixel values included in the image data.

20 Claims, 9 Drawing Sheets

(51) Int. Cl.
*G06T 7/40* (2017.01)
*G06T 7/90* (2017.01)
*G09G 5/02* (2006.01)
*H04N 1/60* (2006.01)
*H04N 5/57* (2006.01)

(58) Field of Classification Search
CPC ....... G06T 3/4015; G06T 3/4038; G06T 5/00; G06T 2207/10024; G06T 5/70; G06T 5/73; G06T 5/80; G06T 5/94; G06T 7/00; G06T 7/11; G06T 7/174; G06T 7/529; G06T 7/536; G06T 7/60; G06T 7/70; G06T 7/80; G06T 15/20; G06T 15/50; G06T 2207/00; G06T 2207/20024; G06T 2207/20182; G06T 2207/20192; G06T 2207/20212; G06T 2207/20221; H04N 1/58; H04N 1/60; H04N 1/6027; H04N 1/6077; H04N 5/57; H04N 5/74; H04N 9/64; H04N 9/67–69; H04N 9/73–79; H04N 5/21; H04N 9/7908; H04N 9/7917; H04N 11/20–24; H04N 13/125; H04N 13/139; H04N 13/144; H04N 19/102; H04N 19/80; G09G 5/02; G09G 5/10; G09G 5/026; G09G 5/028; G09G 5/04; G09G 5/28; G09G 5/30; G09G 5/32; G09G 5/373; G09G 5/38; G09G 5/391; G09G 2320/00; G09G 2320/02; G09G 2320/0233; G09G 2320/0242; G09G 2320/0271; G09G 2320/0276; G09G 2320/028; G09G 2320/04; G09G 2320/06; G09G 2320/0626; G09G 2320/066; G09G 2320/0666; G09G 2320/0673; G09G 2320/0686; G09G 2340/00; G09G 2340/04; G09G 2340/0407; G09G 2340/0457

See application file for complete search history.

(56) References Cited

U.S. PATENT DOCUMENTS

| | | |
|---|---|---|
| 2010/0302418 A1 | 12/2010 | Adams, Jr. et al. |
| 2019/0060602 A1* | 2/2019 | Tran ........................ G16H 20/30 |
| 2020/0020165 A1* | 1/2020 | Tran ........................ G06F 3/011 |
| 2020/0288128 A1* | 9/2020 | Chida ...................... H04N 19/11 |
| 2021/0409624 A1 | 12/2021 | Powell et al. |
| 2023/0033743 A1* | 2/2023 | Kumar ................. G02B 27/017 |
| 2023/0381638 A1* | 11/2023 | Kumar .................... G06F 3/013 |

OTHER PUBLICATIONS

Hiroto Honda et al., "A Color CMOS Imager With 4×4 White-RGB Color Filter Array for Increased Low-Illumination Signal-to-Noise Ratio", IEEE Transactions on Electron Devices, vol. 56, No. 11, Nov. 2009.

* cited by examiner

FIG. 3
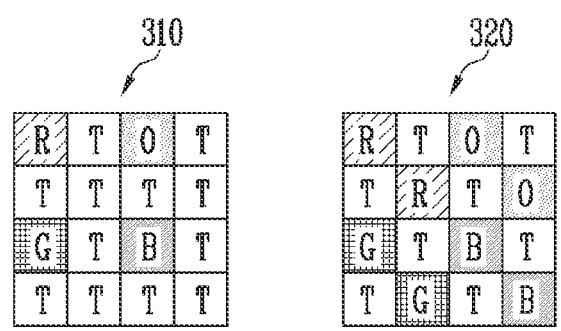
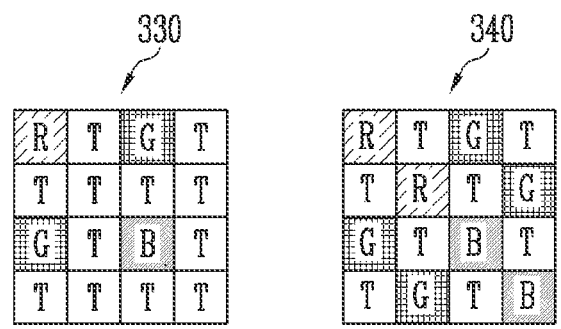

FIG. 4

ELECTRONIC DEVICE AND METHOD OF IMAGE PROCESSING

CROSS-REFERENCE TO RELATED APPLICATION

The present application claims priority under 35 U.S.C. § 119(a) to Korean patent application number 10-2023-0019062 filed on Feb. 14, 2023, in the Korean Intellectual Property Office, the entire disclosure of which is incorporated by reference herein.

BACKGROUND

1. Technical Field

Various embodiments of the present disclosure generally relate to an electronic device, and more particularly, to an electronic device related to image processing.

2. Related Art

Recently, with the diversification of functions of electronic devices, the demand for improvement of an image capturing function using electronic devices has increased. Accordingly, there is required technology for improving the quality of images acquired through electronic devices.

Image data captured by an image sensor contains various types of noise. For example, the image data may contain luminance noise, chromatic noise, etc. As a method in which an electronic device reduces noise from image data, there is a method of blurring an image using an average filter, a Gaussian filter, or the like.

As the method in which the electronic device reduces noise from the image data, a scheme for synthesizing image data having a reduced resolution for a region having a small number of textures in the image data may also be used. However, when noise is contained in image data, it is difficult to determine whether texture is present due to the noise, and thus there may be the case where even a texture region is excessively blurred.

SUMMARY

An embodiment of the present disclosure may provide for an electronic device. The electronic device may include an image sensor configured to obtain image data including color pixel values and texture pixel values using color pixels and texture pixels, a resolution converter configured to generate two or more images having different sizes based on the image data, a parameter calculator configured to acquire two or more parametric images, respectively corresponding to the two or more images, using converted color pixel values and converted texture pixel values that are included in each of the two or more images, a parameter synthesizer configured to acquire a synthesized parametric image by synthesizing the two or more parametric images, and an image acquirer configured to acquire an output image based on the synthesized parametric image and the texture pixel values included in the image data.

An embodiment of the present disclosure may provide for an image processor. The image processor may include a receiver configured to receive image data including color pixel values and texture pixel values from an image sensor, a resolution converter configured to generate two or more images having different sizes based on the image data, a parameter calculator configured to acquire two or more parametric images, respectively corresponding to the two or more images, using converted color pixel values and converted texture pixel values that are included in each of the two or more images, a parameter synthesizer configured to acquire a synthesized parametric image by synthesizing the two or more parametric images, and an image acquirer configured to acquire an output image based on the synthesized parametric image and the texture pixel values included in the image data.

An embodiment of the present disclosure may provide for an image processing method. The image processing method may include obtaining image data including color pixel values and texture pixel values using color pixels and texture pixels that are included in an image sensor, generating two or more images having different sizes based on the image data, acquiring two or more parametric images, respectively corresponding to the two or more images, using converted color pixel values and converted texture pixel values that are included in each of the two or more images, acquiring a synthesized parametric image by synthesizing the two or more parametric images, and acquiring an output image based on the synthesized parametric image and the texture pixel values included in the image data.

BRIEF DESCRIPTION OF THE DRAWINGS

FIG. 3 is a diagram illustrating color pixels and texture pixels included in an image sensor according to an embodiment of the present disclosure.

FIG. 4 is a diagram illustrating an example of image data output from an image sensor according to an embodiment of the present disclosure.

DETAILED DESCRIPTION

Specific structural or functional descriptions in the embodiments of the present disclosure introduced in this specification or application are provided as examples to describe embodiments according to the concept of the present disclosure. The embodiments according to the concept of the present disclosure may be practiced in various forms, and should not be construed as being limited to the embodiments described in the specification or application.

Various embodiments of the present disclosure will now be described in detail with reference to the accompanying drawings so that those skilled in the art can practice the technical spirit of the present disclosure. Various embodiments of the present disclosure may generally relate to reducing a noise contained in image data.

Figure 1:
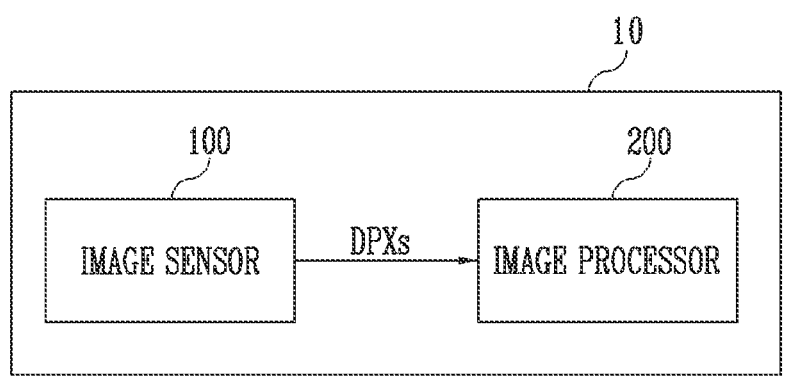
FIG. 1 is a diagram illustrating an electronic device according to an embodiment of the present disclosure.

FIG. 1 is a diagram illustrating an electronic device according to an embodiment of the present disclosure.

Referring to FIG. 1, an electronic device 10 may include an image sensor 100 and an image processor 200. For example, the electronic device 10 may be a digital camera, a mobile device, a smartphone, a tablet PC, a personal digital assistant (PDA), an enterprise digital assistant (EDA), a digital still camera, a digital video camera, a portable multimedia player (PMP), a mobile internet device (MID), a personal computer (PC), a wearable device, a vehicle, or a device including cameras corresponding to various purposes. Alternatively, the electronic device 10 of FIG. 1 may be a part or a module (e.g., a camera module) mounted in other devices.

The image sensor 100 may be implemented as a charge-coupled device (CCD) image sensor or a complementary metal oxide semiconductor (CMOS) image sensor. The image sensor 100 may generate image data corresponding to incident light. The image sensor 100 may convert light information of a subject incident through a lens into an electrical signal, and may provide the electrical signal to the image processor 200.

The image sensor 100 may include a plurality of pixels. The image sensor 100 may generate image data corresponding to a captured scene through the plurality of pixels. The image data may include a plurality of pixel values DPXs. Each of the plurality of pixel values DPXs may be a digital pixel value. The image sensor 100 may provide the image data including the plurality of pixel values DPXs, obtained through the plurality of pixels, to the image processor 200.

The image processor 200 may perform image processing on the image data received from the image sensor 100. For example, the image processor 200 may perform at least one of interpolation, electronic image stabilization (EIS), tonal (hue) correction, image quality correction, size adjustment (resizing), or noise reduction on the image data. The image processor 200 may acquire an image, the quality of which, in an embodiment, is improved through the image processing. The image processor 200 may also be referred to as an image processing device.

Referring to FIG. 1, the image processor 200 may be implemented as a chip independent of the image sensor 100. In this case, the chip of the image sensor 100 and the chip of the image processor 200 may be implemented as one package, for example, a multi-chip package. However, the present disclosure is not limited thereto, and the image processor 200 and the image sensor 100 may be implemented as one chip in such a way that the image processor 200 is included in the image sensor 100 as a part thereof according to an embodiment of the present disclosure.

Figure 2:
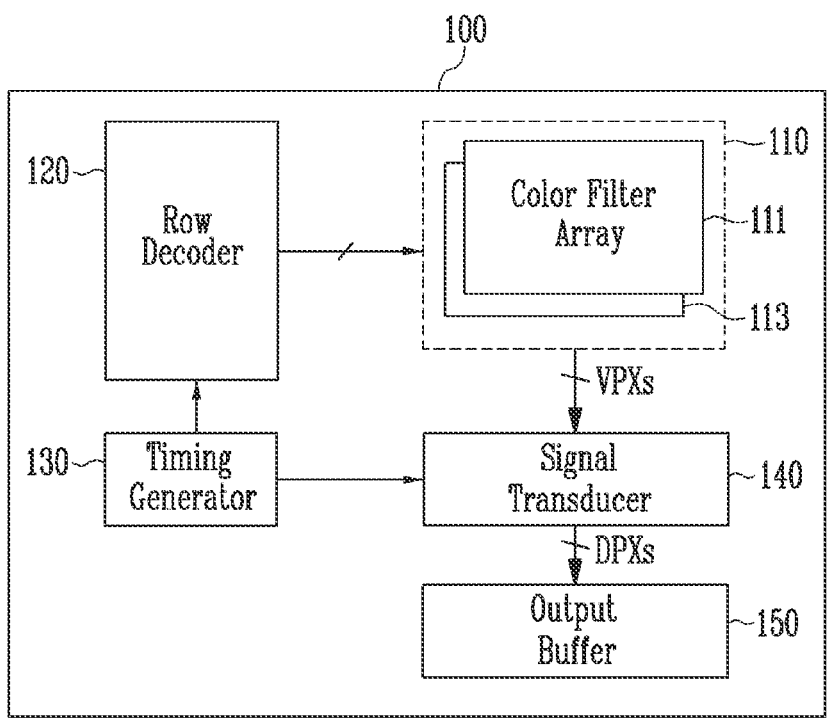
FIG. 2 is a diagram illustrating an image sensor according to an embodiment of the present disclosure.

FIG. 2 is a diagram illustrating an image sensor according to an embodiment of the present disclosure.

Referring to FIG. 2, the image sensor 100 may include a pixel array 110, a row decoder 120, a timing generator 130, and a signal transducer 140. The image sensor 100 may further include an output buffer 150.

The pixel array 110 may include a plurality of pixels arranged in a row direction and a column direction. Each of the pixels may generate pixel signals VPXs corresponding to the intensity of light incident on the corresponding pixel. The image sensor 100 may read out a plurality of pixel signals VPXs for respective rows of the pixel array 110. The plurality of pixel signals VPXs may be analog pixel signals, respectively.

The pixel array 110 may include a color filter array 111. The color filter array 111 may include color filters for allowing only specific colors (e.g., red, green, and blue) of light incident on respective pixels to pass therethrough. Pixels (e.g., color pixels) disposed below the color filter array 111 may output pixel signals corresponding to the intensities of light having specific wavelengths.

The color filter array 111 might not include color filters respectively corresponding to all pixels included in the pixel array 110. That is, the color filter array 111 might not include color filters at positions corresponding to some of the pixels included in the pixel array 110. In the present disclosure, some pixels may be referred to as texture pixels. The texture pixels may output pixel signals corresponding to the intensities of incident light (e.g., incident light corresponding to the overall range of visible light) regardless of the colors or wavelengths of the incident light. The color pixels and texture pixels will be described in detail later with reference to FIG. 3.

The pixel array 110 may include a photoelectric conversion layer 113 including a plurality of photoelectric conversion elements (e.g., photodiodes, phototransistors, photogates or pinned photodiodes). Each of the plurality of pixels may accumulate photocharges corresponding to incident light through the photoelectric conversion layer 113, and may generate and output pixel signals VPXs corresponding to the charged photocharges.

The row decoder 120 may select one of a plurality of rows in which the plurality of pixels are arranged in the pixel array 110 in response to an address and control signals output from the timing generator 130. The image sensor 100 may read out row pixels included in a specific row among the plurality of pixels included in the pixel array 110 under the control of the row decoder 120.

The signal transducer 140 may convert analog pixel signals VPXs into digital pixel values DPXs. The signal transducer 140 may perform correlated double sampling (CDS) on each of the plurality of pixel signals VPXs output from the pixel array 110 in response to control signals output from the timing generator 130, and may output a plurality of digital pixel values DPXs by performing analog-to-digital conversion on respective correlated double sampled signals.

The signal transducer 140 may include a correlated double sampling (CDS) block and an analog-to-digital converter (ADC) block. The CDS block may sequentially sample and hold sets of reference signals and image signals provided from respective column lines included in the pixel array 110. Here, a reference signal may correspond to a pixel signal that is read out after the corresponding pixel included in the pixel array 110 is reset, and an image signal may correspond to a pixel signal that is read out after the corresponding pixel is exposed. The CDS block may obtain a readout noise-reduced signal using the difference between the levels of a reference signal and an image signal that correspond to each of columns. The ADC block may perform analog-to-digital conversion on analog signals (e.g., pixel signals VPXs) corresponding to respective columns, output from the CDS block, and may then output digital signals (e.g., pixel values DPXs). For this operation, the ADC block may include comparators and counters corresponding to respective columns.

The output buffer 150 may be implemented using a plurality of buffers which store the digital signals output from the signal transducer 140. In detail, the output buffer 150 may latch and output pixel values in respective columns, which are provided from the signal transducer 140. The output buffer 150 may store the pixel values output from the signal transducer 140, and may sequentially output the pixel values under the control of the timing generator 130. It may be understood that the sequentially output pixel values are included in the image data. In an embodiment of the present disclosure, the output buffer 150 may be omitted.

FIG. 3 is a diagram illustrating color pixels and texture pixels included in an image sensor according to an embodiment of the present disclosure.

FIG. 3 illustrates an example of a pixel array (e.g., the pixel array 110 of FIG. 2) according to the present disclosure. The image sensor 100 of the electronic device 10 according to the present disclosure may include color pixels (e.g., R, G, B, and O), and texture pixels T. The color pixels (e.g., R, G, B, and O) and the texture pixels T may be arranged in various forms, as illustrated in FIG. 3.

Each of the color pixels (e.g., R, G, B, and O) may be a pixel on which light having a specific wavelength is incident through a color filter corresponding thereto. The texture pixels T may be pixels having no color filters corresponding thereto, and may be referred to as black and white pixels or monochrome pixels. For example, the color pixels (e.g., R, G, B, and O) may obtain color pixel values corresponding to incident light of specific colors (red, green, blue, and orange) through color filters, each allowing incident light having a specific wavelength to pass therethrough. Unlike the color pixels, the texture pixels T may obtain texture pixel values depending on incident light (e.g., visible light) that is not limited to a specific color.

A pixel array 310 may include color pixels of four colors (e.g., R, G, B, and O), and texture pixels T. The pixel array 310 may include a red pixel R, a green pixel G, a blue pixel B, an orange pixel O, and texture pixels T. Referring to FIG. 3, the pixel array 310 may include unit pixels, each including pixels in a 2×2 array, wherein each unit pixel may include one color pixel (e.g., R, G, B, or O) and three texture pixels T.

A pixel array 320 may include color pixels of four colors (e.g., R, G, B, and O), and texture pixels T. The pixel array 320 may include a red pixel R, a green pixel G, a blue pixel B, an orange pixel O, and texture pixels T. Referring to FIG. 3, the pixel array 320 may include unit pixels, each including pixels in a 2×2 array, wherein each unit pixel may include two color pixels (e.g., R, G, B, or O) and two texture pixels T. In the case of the pixel array 320, two color pixels included in each unit pixel may be color pixels corresponding to the same color.

A pixel array 330 may include color pixels of three colors (e.g., R, G, and B), and texture pixels T. The pixel array 330 may include a red pixel R, green pixels G, a blue pixel B, and texture pixels T. Referring to FIG. 3, the pixel array 330 may include unit pixels, each including pixels in a 2×2 array, wherein each unit pixel may include one color pixel (e.g., R, G, or B) and three texture pixels T.

A pixel array 340 may include color pixels of three colors (e.g., R, G, and B), and texture pixels T. The pixel array 340 may include a red pixel R, green pixels G, a blue pixel B, and texture pixels T. Referring to FIG. 3, the pixel array 340 may include unit pixels, each including pixels in a 2×2 array, wherein each unit pixel may include two color pixels (e.g., R, G, or B) and two texture pixels T. In the case of the pixel array 340, two color pixels included in each unit pixel may be color pixels corresponding to the same color.

Although four examples in which the color pixels (e.g., R, G, B, and O) and the texture pixels T can be arranged are illustrated, in FIG. 3, the scope of the present disclosure is not limited thereto. For example, the pixel array 110 of the image sensor 100 may have a pixel arrangement of cyan, magenta, and yellow (CMY) colors in addition to RGB or RGBO. In an additional example, the pixel array 110 may be configured such that a color pixel is arranged at another possible position (e.g., a top-right position), instead of a top-left position (or top-left and bottom-right positions), in each unit pixel.

Figure 4:
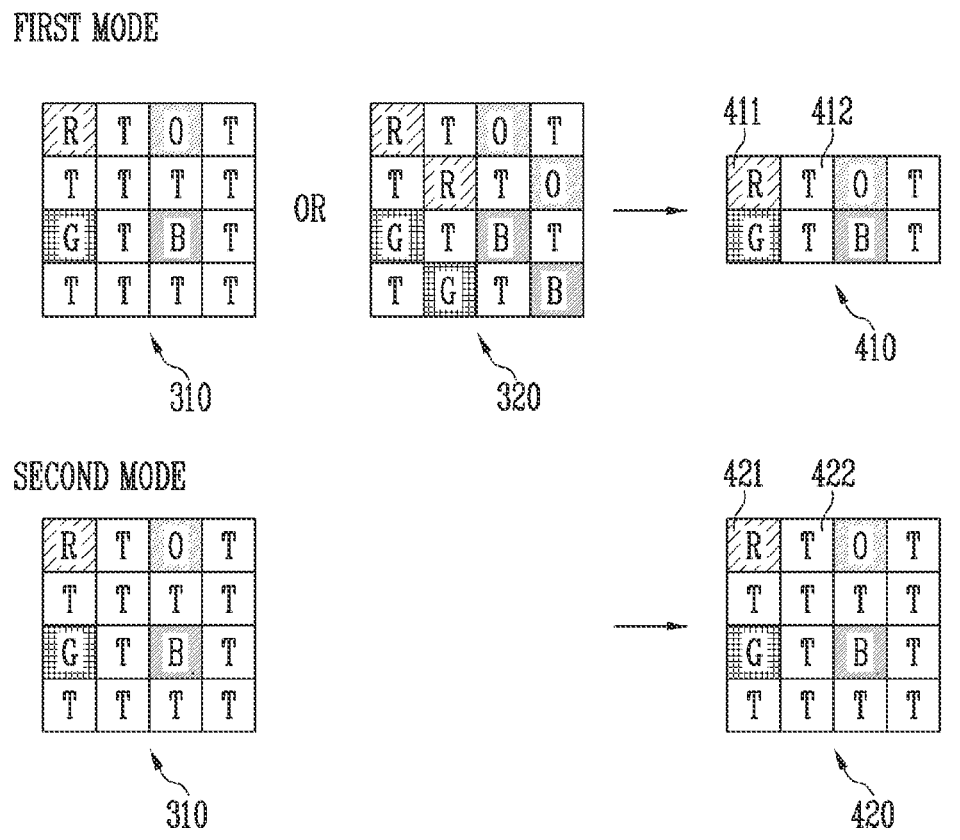

FIG. 4 is a diagram illustrating an example of image data output from an image sensor according to an embodiment of the present disclosure.

FIG. 4 illustrates the forms of pieces of image data 410 and 420, which are obtained and output by the image sensor 100 using color pixels (e.g., R, G, B, and O) and texture pixels T. The image sensor 100 may generate the image data 410 or 420, which is output to the image processor 200, in different forms depending on modes.

In a first mode, the image sensor 100 may output the image data 410 including a smaller number of pixel values than the total number of pixels (e.g., ½ of the total number of pixels). The image sensor 100 may output one color pixel value 411 and one texture pixel value 412 in each unit pixel. In an example, when the image sensor 100 includes the pixel array 310, the image sensor 100 may output a texture pixel value 412, which is obtained by adding or averaging values acquired from three texture pixels T included in each unit pixel. In an example, when the image sensor 100 includes the pixel array 320, the image sensor 100 may output a color pixel value 411, which is obtained by adding or averaging values acquired from two color pixels R included in each unit pixel, and may output a texture pixel value 412, which is obtained by adding or averaging values acquired from two texture pixels T included in each unit pixel. The first mode may be referred to as a half resolution mode.

In a second mode, the image sensor 100 may output the image data 420 including a number of pixel values corresponding to the total number of pixels. The image sensor 100 may output image data 420 including individual pixel values, without adding or averaging the values acquired through respective pixels. For example, when the image sensor 100 includes the pixel array 310, the image sensor 100 may output one color pixel value 421 and three texture pixel values 422 in each unit pixel. Although not illustrated in FIG. 4, the image sensor 100 may output two color pixel values and two texture pixel values in each unit pixel when the image sensor 100 includes the pixel array 320. The second mode may be referred to as a full resolution mode.

Although in FIG. 4, examples of the image data 410 and 420 are illustrated on the assumption that the image sensor 100 includes the pixel array 310 or 320 having R, G, B, and O colors, the form of image data that is generated may be determined depending on the first mode or the second mode even when the image sensor 100 includes the pixel array 330 or 340 having an additional arrangement.

Figure 5:
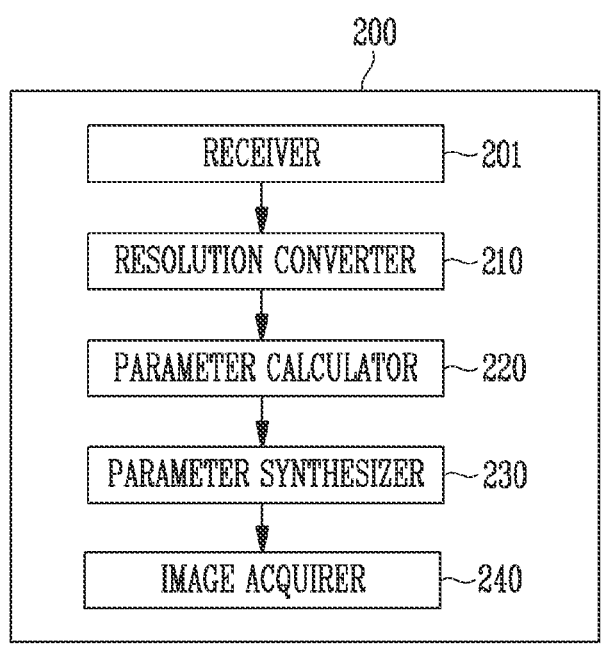
FIG. 5 is a diagram illustrating an image processor according to an embodiment of the present disclosure.

FIG. 5 is a diagram illustrating an image processor according to an embodiment of the present disclosure.

Referring to FIG. 5, the image processor 200 may include a receiver 201, a resolution converter 210, a parameter calculator 220, a parameter synthesizer 230, and an image acquirer 240. The receiver 201 may receive image data 410 or 420 from the image sensor 100. The receiver 201 may receive image data including color pixel values and texture pixel values from the image sensor 100.

The resolution converter 210 may generate two or more images having different sizes based on the image data 410 or 420. The resolution converter 210 may include a first resolution converter, which converts the resolution of the image data 410 or 420 and then acquires a first image having a reduced size compared to the image data 410 or 420. Also, the resolution converter 210 may include a second resolution converter, which converts the resolution of the first image and then acquires a second image having a reduced size compared to the first image. For example, the first image may have a size reduced to ½ of that of the image data 410 or 420, and the second image may have a size reduced to ¼ of that of the image data 410 or 420.

The parameter calculator 220 may acquire two or more parametric images, respectively corresponding to the two or more images, using converted color pixel values and converted texture pixel values that are included in each of the two or more images. The parameter calculator 220 may include a first parameter calculator, which acquires a first parametric image corresponding to the first image using first converted color pixel values and first converted texture pixel values that are included in the first image. Further, the parameter calculator 220 may include a second parameter calculator, which acquires a second parametric image corresponding to the second image using second converted color pixel values and second converted texture pixel values that are included in the second image.

The parameter synthesizer 230 may acquire a synthesized parametric image by synthesizing the two or more parametric images. For example, the parameter synthesizer 230 may generate the synthesized parametric image based on the first parametric image and the second parametric image.

The image acquirer 240 may acquire an output image based on the synthesized parametric image and the texture pixel value 412 or 422 included in the image data 410 or 420. The image acquirer 240 may generate an output image in which noise is reduced compared to the image data 410 or 420 using the synthesized parametric image.

A detailed method in which the image processor 200 reduces noise contained in the image data using the resolution converter 210, the parameter calculator 220, the parameter synthesizer 230, and the image acquirer 240 will be described below with reference to the flowchart of FIG. 6 and examples of FIGS. 7 to 10.

Figure 6:
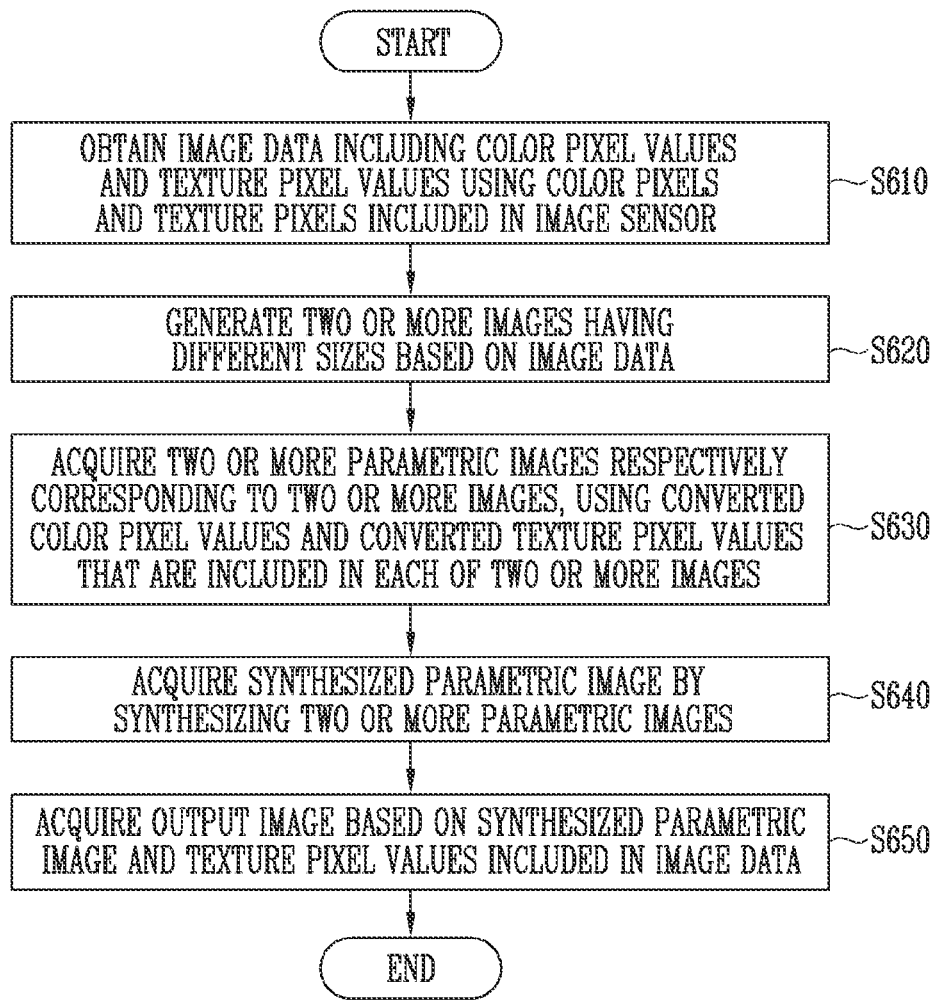
FIG. 6 is a flowchart illustrating a method of reducing noise contained in image data according to an embodiment of the present disclosure.

FIG. 6 is a flowchart illustrating a method of reducing noise contained in image data according to an embodiment of the present disclosure. Steps illustrated in FIG. 6 may be performed by the electronic device 10, or the image sensor 100 and the image processor 200, which are included in the electronic device 10.

At step S610, the image sensor 100 may acquire image data 410 or 420 including color pixel values (e.g., 411 or 421) and texture pixel values (e.g., 412 or 422) using color pixels (e.g., R, G, B, and O) and texture pixels T. The image sensor 100 may provide the image data (e.g., 410 or 420) to the image processor 200, and the image processor 200 may receive the image data (e.g., 410 or 420) through the receiver 201.

At step S620, the image processor 200 (e.g., the resolution converter 210) may generate two or more images having different sizes based on the image data (e.g., 410 or 420). The resolution converter 210 may acquire a plurality of images by reducing the resolution of the image data. As the resolution of the image data is converted by the resolution converter 210, the two or more images may include converted color pixel values and converted texture pixel values.

At step S630, the image processor 200 (e.g., the parameter calculator 220) may acquire two or more parametric images, respectively corresponding to the two or more images, using converted color pixel values and converted texture pixel values that are included in each of the two or more images.

The parameter calculator 220 may acquire a first parametric image corresponding to a first image using first converted color pixel values and first converted texture pixel values that are included in the first image. Further, the parameter calculator 220 may acquire a second parametric image corresponding to a second image using second converted color pixel values and second converted texture pixel values that are included in the second image.

The parameter calculator 220 may obtain a first parameter value corresponding to a first point within the first parametric image, by using first converted color pixel values and first converted texture pixel values that are included in a first region centered around the first point in the first image (e.g., a region including 5×5 pixels centered around the first point) among the first converted color pixel values and the first converted texture pixel values that are included in the first image.

At step S640, the image processor 200 (e.g., the parameter synthesizer 230) may acquire a synthesized parametric image by synthesizing two or more parametric images. The parameter synthesizer 230 may generate the synthesized parametric image based on the first parametric image for a partial region in which a number of textures equal to or greater than a certain level are present, and based on the second parametric image for the remaining partial region. The level of the textures may mean an amount of the textures or a quantity of the textures. For example, the parameter synthesizer 230 may acquire a synthesized parametric image by performing multi-scale processing on two or more parametric images. The term "multi-scale processing" may refer to an operation of selecting a parametric image having a low resolution for a smooth image region having no textures and selecting a parametric image having a high resolution for a texture image region, based on parametric images having different sizes.

At step S650, the image processor 200 (e.g., the image acquirer 240) may acquire an output image based on the synthesized parametric image and the texture pixel values (e.g., 412 or 422). The image acquirer 240 may obtain a function corresponding to the synthesized parametric image and input both a pixel position and the texture pixel value (e.g., 412 or 422) corresponding to the pixel position to the function, thus generating the output image.

An output image generation method, described in FIG. 6, will be described in detail below using the following Equations.

At step S650, the pixel values of the output image generated by the image acquirer 240 may be represented by the following Equation (1):

$$R(x, y) = f_R(x, y, T(x, y));  G(x, y) = f_G(x, y, T(x, y)); \qquad (1)$$
$$B(x, y) = f_B(x, y, T(x, y))$$

In Equation (1), (x, y) may denote the coordinates of a pixel on the output image. In Equation (1), T(x, y) may represent a texture pixel value at the position (x, y) in the image data (e.g., 410 or 420). Further, R(x, y), G(x, y), and B(x, y) may represent color pixel values at the position (x, y) in the output image. Although only the color pixel values R(x, y), G(x, y), and B(x, y) are indicated in Equation (1) on the assumption that the output image is an image of a Bayer pattern, the output image may be represented by R(x, y), G(x, y), B(x, y), and O(x, y) when the output image is an RGBO image.

In Equation (1), $f_R(x, y, T)$, $f_G(x, y, T)$, and $f_B(x, y, T)$ may be functions required to convert the texture pixel value T(x, y) into RGB pixel values of the output image. Each of the functions $f_R(x, y, T)$, $f_G(x, y, T)$, and $f_B(x, y, T)$ in Equation (1) may be modeled using at least one parameter. The function f(x, y, T) in Equation (2) and Equation (3) may represent each of $f_R(x, y, T)$, $f_G(x, y, T)$, and $f_B(x, y, T)$.

$$f(x, y, T) = c_0(x, y) + c_1(x, y)T \qquad (2)$$

For example, when the function f(x, y, T) is modeled as a linear function, the function f(x, y, T) modeled as the linear function may be represented by Equation (2). In Equation (2), $c_0(x, y)$ and $c_1(x, y)$ may correspond to respective parameters.

$$f(x, y, T) = c_0(x, y) + c_1(x, y)T + c_1(x, y)T^2 \qquad (3)$$

For example, when the function f(x, y, T) is modeled as a quadratic function, the function f(x, y, T) modeled as the quadratic function may be represented by Equation (3). In Equation (3), $c_0(x, y)$, $c_1(x, y)$, and $c_2(x, y)$ may correspond to respective parameters.

Referring to Equations (2) and (3), parameters related to the function (x, y, T) (e.g., $c_0(x, y)$, $c_1(x, y)$, and $c_2(x, y)$) may have parameter values determined for respective pixel coordinates (x, y). Therefore, $c_0(x, y)$, $c_1(x, y)$, and/or $c_2(x, y)$ may be referred to as parametric images, respectively. Furthermore, $c_0$ and $c_1$ (or $c_0$, $c_1$, and $c_2$) may be referred to as parametric image sets.

The parameter calculator 220 may acquire the parametric images using Equations (4) and (5). For example, when the function f(x, y, T) is modeled as a linear function, the parametric images $c_0$ and $c_1$ in Equation (2) may be calculated using Equations (4) and (5) that utilize a least square method. In the present disclosure, a parametric image corresponding to one image (e.g., image data or the first image) may be understood to be a parametric image set including $c_0$ and $c_1$ (or $c_0$, $c_1$, and $c_2$).

$$c_{1,color} = \frac{N\sum_{x',y' \in S} I_{color}(x', y')T(x', y') - \sum_{x',y' \in S} I_{color}(x', y')\sum_{x',y' \in S} T(x', y')}{N\sum_{x',y' \in S}\{T(x', y')\}^2 - \left[\sum_{x',y' \in S} T(x', y')\right]^2} \qquad (4)$$

$$c_{0,color} = \frac{N\sum_{x',y' \in S} I_{color}(x', y')\{T(x', y')\}^2 - \sum_{x',y' \in S} I_{color}(x', y')\sum_{x',y' \in S} T(x', y')}{N\sum_{x',y' \in S}\{T(x', y')\}^2 - \left[\sum_{x',y' \in S} T(x', y')\right]^2} \qquad (5)$$

In Equations (4) and (5), the color in $c_{0,color}$ and $c_{1,color}$ may represent R, G, or B. For example, parametric images $c_0$ and $c_1$ of the function $f_R(x, y, T)$ may be $c_{0,R}$ and $c_{1,R}$, respectively. Further, in Equations (4) and (5), $I_{color}(x', y')$ may represent the color pixel value of the corresponding color, among the color pixel values of the image data (e.g., 410 or 420), and may represent R(x', y') in the case of a red pixel.

Referring to Equations (4) and (5), the parameter calculator 220 may obtain a first parameter value (e.g., $c_0(x, y)$ or $c_1(x, y)$) corresponding to the first point (x, y) in the parametric image $c_0$ or $c_1$ using color pixel values and texture pixel values included in a first region S centered around the first point (x, y) among the color pixel values (e.g., 411 or 421) and the texture pixel values (e.g., 412 or 422) included in the image data (e.g., 410 or 420). In Equations (4) and (5), S may be understood to be a region including a plurality of pixels centered around the pixel coordinates (x, y).

Although, in relation to Equations (4) and (5), the parameter calculator 220 has been described as being capable of acquiring the parametric images $c_0$ and $c_1$ based on the image data (e.g., 410 or 420), the parameter calculator 220 may obtain parametric image sets corresponding to respective images based on two or more images (e.g., the first image and the second image) having a reduced size compared to the image data, in addition to the image data (e.g., 410 and 420). Therefore, the parameter calculator 220 may obtain parametric image sets (e.g., parametric images $c_0$ and $c_1$) respectively corresponding to two or more images having different sizes.

When the parameter calculator 220 obtains two or more parametric image sets respectively corresponding to two or more images, the parameter synthesizer 230 may obtain a synthesized parametric image set by synthesizing the two or more parametric image sets. However, for convenience of description, in the present disclosure, the synthesized parametric image set may be referred to as a synthesized parametric image. The parameter synthesizer 230 may generate the synthesized parametric image set by selecting a specific parametric image depending on the presence or non-presence of texture/the degree of texture, based on the two or more parametric image sets. The synthesized parametric image set may include parametric images (e.g., $c_{0,R}$, $c_{1,R}$, $c_{0,G}$, $c_{1,G}$, $c_{0,B}$, and $c_{1,B}$) depending on respective colors (e.g., R, G, and B).

The image acquirer 240 may determine the function f(x, y, T) based on the synthesized parametric image set. The image acquirer 240 may obtain R(x, y), G(x, y), and B(x, y) by inputting the pixel position (x, y) and the texture pixel value T(x, y) to the determined function f(x, y, T).

The electronic device 10 may acquire an output image in which noise is reduced compared to the image data 410 and 420 by utilizing the parametric images acquired using the scheme such as those in Equations (4) and (5) based on the image data 410 and 420. Because light corresponding to wavelengths in a range wider than that of the color pixels R, G, B, and O is incident on each texture pixel T, the texture pixel values 412 and 422 may include a smaller amount of noise than that of the color pixel values 411 and 421. Therefore, the image processor 200 may represent the pixel values R(x, y), G(x, y), and B(x, y) of the output image by the function of the texture pixel value T(x, y), thus obtaining the pixel values (x, y), G(x, y), and B(x, y) of the output image having less noise from the less-noise texture pixel value T(x, y).

However, when the shape of the function f(x, y, T) for obtaining the pixel values (x, y), G(x, y), and B(x, y) of the output image using the texture pixel value T(x, y) is inaccurate, the values of R(x, y), G(x, y), and B(x, y) may also be inaccurate. Therefore, the image processor 200 may statistically estimate the parametric images $c_0$ and $c_1$ based on color pixel values and texture pixel values located near the pixel coordinates (x, y), and may determine the shape of the function f(x, y, T) through the estimated parametric images. For example, the image processor 200 may improve the precision of function estimation by calculating parametric images through a least square method, as represented by Equations (4) and (5).

Further, the image processor 200 may obtain not only parametric image sets corresponding to the image data 410 and 420 but also parametric images sets respectively corresponding to two or more images having reduced sizes compared to the image data 410 and 420. By means of this, the image processor 200 may use pixel values (e.g., color pixel values and texture pixel values) falling within a wider range based on the pixel coordinates (x, y) to estimate the shape of the function.

The electronic device 10 may acquire an output image which is not excessively blurred while reducing noise, by utilizing the texture pixel value T(x, y), together with the synthesized parametric image, which is acquired based on parametric images having different sizes. Unlike the present disclosure, when multi-scale processing is performed on images (e.g., color images) other than parametric images, a specific region in the synthesized image may be excessively blurred. For example, multi-scale processing on images may refer to a process of selecting an image, which is not reduced, for a texture region and selecting a reduced image (or an image that is simply magnified after the resolution thereof is reduced) for a non-texture region, and then synthesizing the selected images. However, when noise is contained in the corresponding image, even a texture image region may be determined to have no textures, whereby the reduced image may be selected and synthesized. That is, when noise is contained in the image, it is difficult to determine whether texture is present due to the noise, and thus there may be the case where even a texture region is excessively blurred.

However, according to an embodiment of the present disclosure, the image processor 200 may perform multi-scale processing on the parametric images (e.g., $c_0$ and $c_1$) other than the pieces of image data 410 and 420 (or the first image and the second image). As the image processor 200 performs multi-scale processing based on parametric images, an excessively blurred region (or an unnecessarily blurred region) may be included in the synthesized parametric image. However, the image processor 200 acquires an output image by substituting the texture pixel value T(x, y) into the function f(x, y, T) determined based on the synthesized parametric image. In this case, because a high-frequency component (e.g., texture) is included in the texture pixel value T(x, y), an excessively blurred region might not be included in the output image. That is, in an embodiment, even though blur occurs in the synthesized parametric image, R(x, y), G(x, y), and B(x, y) may be obtained based on T(x, y), thus minimizing blur included in the output image.

Hereinafter, a detailed example in which components included in the image processor 200 generate an output image depending on the output of the image sensor 100 will be described.

Figure 7:
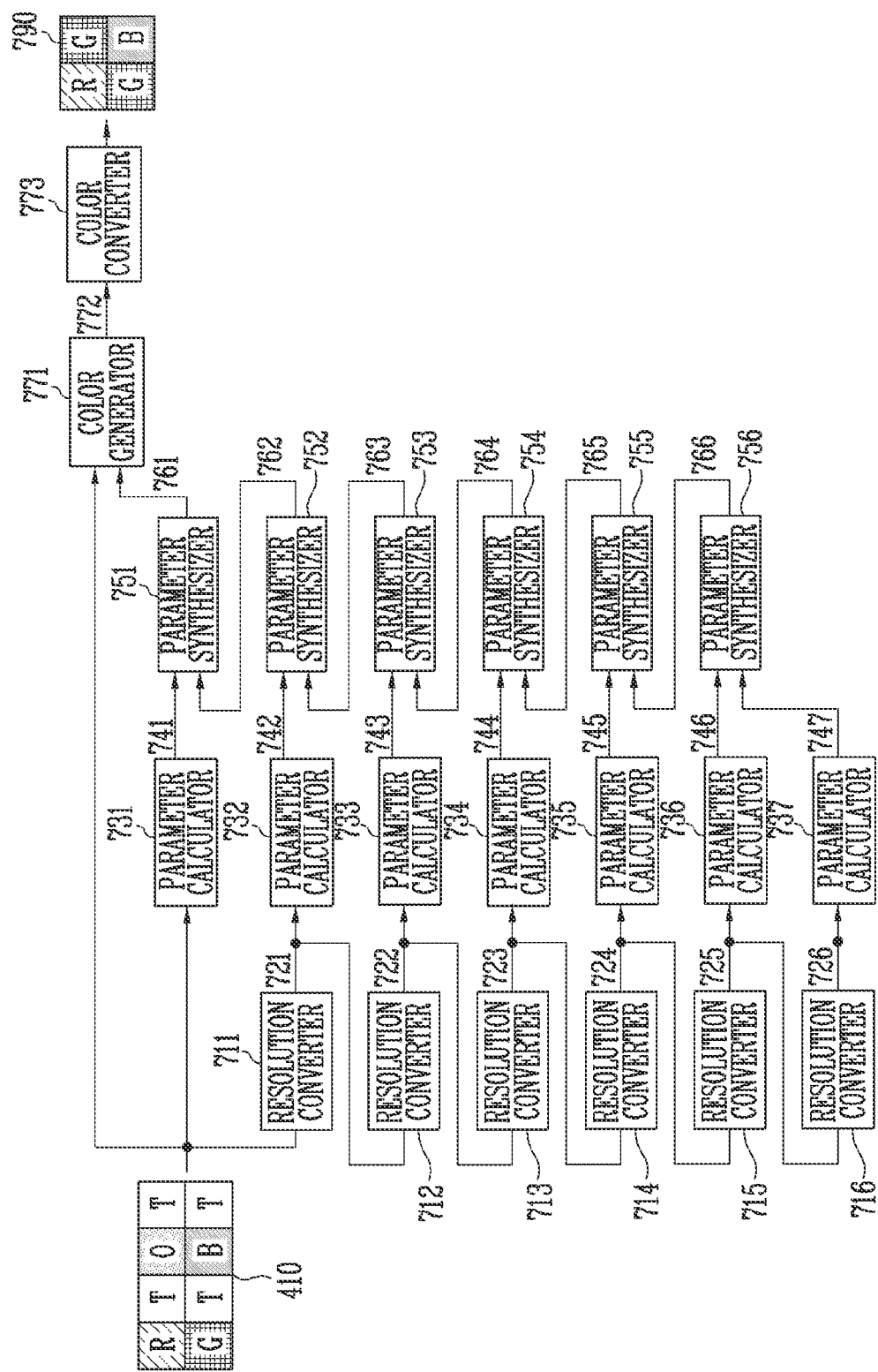
FIG. 7 is a diagram illustrating an example of the configuration of an image processor for acquiring an image in which noise is reduced using parametric images according to an embodiment of the present disclosure.

FIG. 7 is a diagram illustrating an example of the configuration of the image processor for acquiring an image in which noise is reduced using parametric images according to an embodiment of the present disclosure.

The image processor 200 may receive image data 410 from the image sensor 100 through the receiver 201. The image data 410 may correspond to image data 410, which is output from the image sensor 100 in a first mode, as illustrated in FIG. 4.

The image processor 200 may acquire a first image 721 having a reduced size compared to the image data 410 by converting the resolution of the image data 410 through a resolution converter 711. The first image 721 may include pixel values R, G, B, O, and T having reduced sizes compared to the image data 410. For example, the first image 721 may have a size that is ½ of that of the image data 410.

The image processor 200 may acquire a second image 722 having a reduced size compared to the first image 721 by converting the resolution of the first image 721 through a resolution converter 712. The second image 722 may include pixel values R, G, B, O, and T having reduced sizes compared to the first image 721. For example, the second image 722 may have a size that is ¼ of that of the image data 410.

Similarly, the image processor 200 may acquire a third image 723 having a reduced size compared to the second image 722 through a resolution converter 713, may acquire a fourth image 724 having a reduced size compared to the third image 723 through a resolution converter 714, may acquire a fifth image 725 having a reduced size compared to the fourth image 724 through a resolution converter 715, and may acquire a sixth image 726 having a reduced size compared to the fifth image 725 through a resolution converter 716. The third image 723 may have a size that is ⅛ of that of the image data 410, the fourth image 724 may have a size that is 1/16 of that of the image data 410, the fifth image 725 may have a size that is 1/32 of that of the image data 410, and the sixth image 726 may have a size that is 1/64 of that of the image data 410.

The image processor 200 may acquire a parametric image 741 using color pixel values and texture pixel values that are included in the image data 410 through a parameter calculator 731. The parametric image 741 may be understood to be a parametric image set including parametric images (e.g., $c_0$, $c_1$, $c_2$) acquired for each of colors (e.g., R, G, B, and O) based on the color pixel values and the texture pixel values that are included in the image data 410. For example, the parametric image 741 may have a size that is 1/1 of that of the image data 410.

The image processor 200 may acquire a parametric image 742 using converted color pixel values and converted texture pixel values that are included in the first image 721 through a parameter calculator 732. The parametric image 742 may be understood to be a parametric image set including parametric images (e.g., $c_0$, $c_1$, and $c_2$) acquired for each of colors (e.g., R, G, B, and O) based on the converted color pixel values and the converted texture pixel values that are included in the first image 721. For example, the parametric image 742 may have a size that is ½ of that of the image data 410. Furthermore, the parametric image 742 may be referred to as a first parametric image.

The image processor 200 may acquire a parametric image 743 using converted color pixel values and converted texture pixel values that are included in the second image 722 through a parameter calculator 733. The parametric image 743 may be understood to be a parametric image set including parametric images (e.g., $c_0$, $c_1$, and $c_2$) acquired for each of colors (e.g., R, G, B, and O) based on the converted color pixel values and the converted texture pixel values that are included in the second image 722. For example, the parametric image 743 may have a size that is ¼ of that of the image data 410. Furthermore, the parametric image 743 may be referred to as a second parametric image.

Similarly, the image processor 200 may acquire a parametric image 744 corresponding to the third image 723 through a parameter calculator 734, may acquire a parametric image 745 corresponding to the fourth image 724 through a parameter calculator 735, may acquire a parametric image 746 corresponding to the fifth image 725 through a parameter calculator 736, and may acquire a parametric image 747 corresponding to the sixth image 726 through a parameter calculator 737. The parametric image 744 may have a size that is ⅛ of that of the image data 410, the parametric image 745 may have a size that is 1/16 of that of the image data 410, the parametric image 746 may have a size that is 1/32 of that of the image data 410, and the parametric image 747 may have a size that is 1/64 of that of the image data 410.

The image processor 200 may acquire an intermediate synthesized parametric image 766 by synthesizing the parametric image 746 and the parametric image 747 through a parameter synthesizer 756. The intermediate synthesized parametric image 766 may have a size that is 1/32 of that of the image data 410, and may be understood to be an intermediate synthesized parametric image set including intermediate synthesized parametric images (e.g., $c_0$, $c_1$, and $c_2$) acquired for each of colors (e.g., R, G, B, and O).

The image processor 200 may acquire an intermediate synthesized parametric image 765 by synthesizing the parametric image 745 and the intermediate synthesized parametric image 766 through a parameter synthesizer 755. The intermediate synthesized parametric image 765 may have a size of 1/16 of that of the image data 410.

Similarly, the image processor 200 may acquire an intermediate synthesized parametric image 764 by synthesizing the parametric image 744 and the intermediate synthesized parametric image 765 through a parameter synthesizer 754, may acquire an intermediate synthesized parametric image 763 by synthesizing the parametric image 743 and the intermediate synthesized parametric image 764 through a parameter synthesizer 753, may acquire an intermediate synthesized parametric image 762 by synthesizing the parametric image 742 and the intermediate synthesized parametric image 763 through a parameter synthesizer 752, and may acquire a synthesized parametric image 761 by synthesizing the parametric image 741 and the intermediate synthesized parametric image 762 through a parameter synthesizer 751. The intermediate synthesized parametric image 764 may have a size that is ⅛ of that of the image data 410, the intermediate synthesized parametric image 763 may have a size that is ¼ of that of the image data 410, the intermediate synthesized parametric image 762 may have a size that is ½ of that of the image data 410, and the synthesized parametric image 761 may have a size that is 1/1 of that of the image data 410.

The image processor 200 may acquire an RGBO image 772 using both the synthesized parametric image 761 and the texture pixel values 412, included in the image data 410, through a color generator 771. The RGBO image 772 may have a size of 1/1 of that of the image data 410. The image processor 200 may acquire an output image 790 by converting the colors of the RGBO image 772 into RGB through a color converter 773. In an embodiment illustrated in FIG. 7, it may be understood that the color generator 771 and the color converter 773 are included in the image acquirer 240 of FIG. 5.

Although, in FIG. 7, the image processor 200 is illustrated and described as including six resolution converters, this structure is only an example, and the scope of the present disclosure is not limited thereto. For example, the image processor 200 may include five or fewer resolution converters, or may include seven or more resolution converters.

Figure 8:
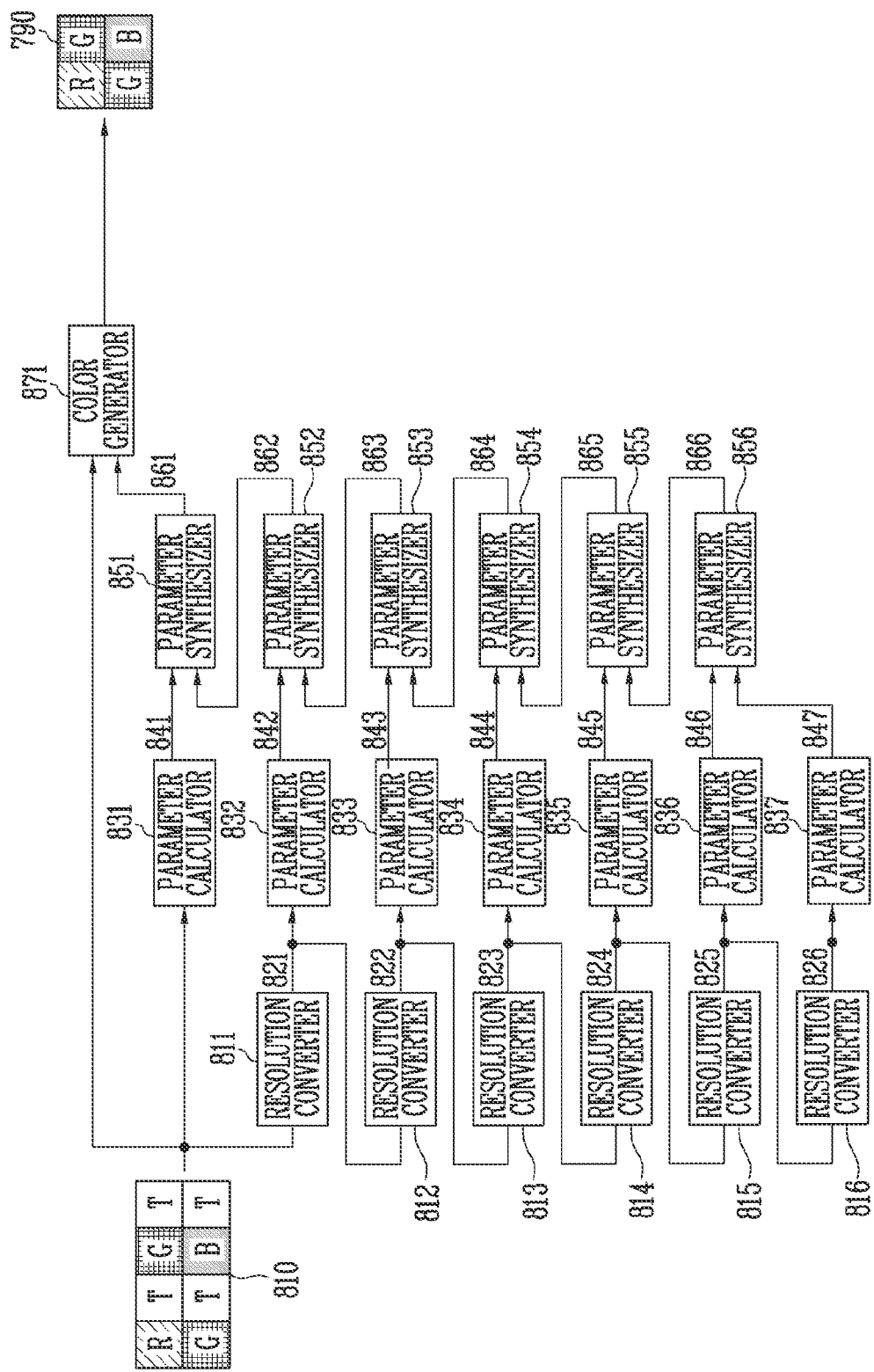
FIG. 8 is a diagram illustrating an example of the configuration of an image processor for acquiring an image in which noise is reduced using parametric images according to an embodiment of the present disclosure.

FIG. 8 is a diagram illustrating an example of the configuration of an image processor for acquiring an image in which noise is reduced using parametric images according to an embodiment of the present disclosure.

The image processor 200 may receive image data 810 from the image sensor 100 through the receiver 201. When the image sensor 100 includes the pixel array 330 or pixel array 340 of FIG. 3 and is operated in a first mode, image data 810 output from the image sensor 100 may include R, G, and B color pixel values and texture pixel values, unlike image data 410.

Referring to FIG. 8, most of operations performed by resolution converters 811, 812, 813, 814, 815, and 816, parameter calculators 831, 832, 833, 834, 835, 836, and 837, and parameter synthesizers 851, 852, 853, 854, 855, and 856 may be identical to the operations performed by the resolution converters 711, 712, 713, 714, 715, and 716, the parameter calculators 731, 732, 733, 734, 735, 736, and 737, and the parameter synthesizers 751, 752, 753, 754, 755, and 756, which are illustrated in FIG. 7. Therefore, unless special description is made in relation to FIG. 8, description of FIG. 7 may also be applied to FIG. 8.

However, compared to the case where color pixel values of an orange color are included in the image data 410 of FIG. 7, the color pixel values of an orange color are not included in the image data 810 of FIG. 8, and thus there may be a difference in that, unlike FIG. 7, color pixel values of a green color, instead of the color pixel values of the orange color, are used in FIG. 8. For example, compared to the case where each of the first image 721, the second image 722, the third image 723, the fourth image 724, the fifth image 725, and the sixth image 726 of FIG. 7 includes R, G, B, O, and T pixel values, each of a first image 821, a second image 822, a third image 823, a fourth image 824, a fifth image 825, and a sixth image 826 of FIG. 8 may include R, G, B, and T pixel values. Further, compared to the case where the parametric images 741, 742, 743, 744, 745, 746, and 747 of FIG. 7 are acquired for each of R, G, B, and O colors, parametric images 841, 842, 843, 844, 845, 846, and 847 of FIG. 8 may be acquired for each of R, G, and B colors. Similarly, compared to the case where the intermediate synthesized parametric images 766, 765, 764, 763, and 762 and the synthesized parametric image 761 of FIG. 7 are acquired for each of R, G, B, and O colors, intermediate parametric images 866, 865, 864, 863, and 862 and a synthesized parametric image 861 of FIG. 8 may be acquired for each of R, G, and B colors.

In FIG. 8, the image processor 200 may acquire an output image 790 using both the synthesized parametric image 861 and texture pixel values, included in the image data 810, through a color generator 871. It may be understood that the color generator 871 is included in the image acquirer 240 of FIG. 5. Because the synthesized parametric image 861 and the image data 810 are irrelevant to an orange color, the color converter 773 may be omitted in FIG. 8, unlike FIG. 7.

Figure 9:
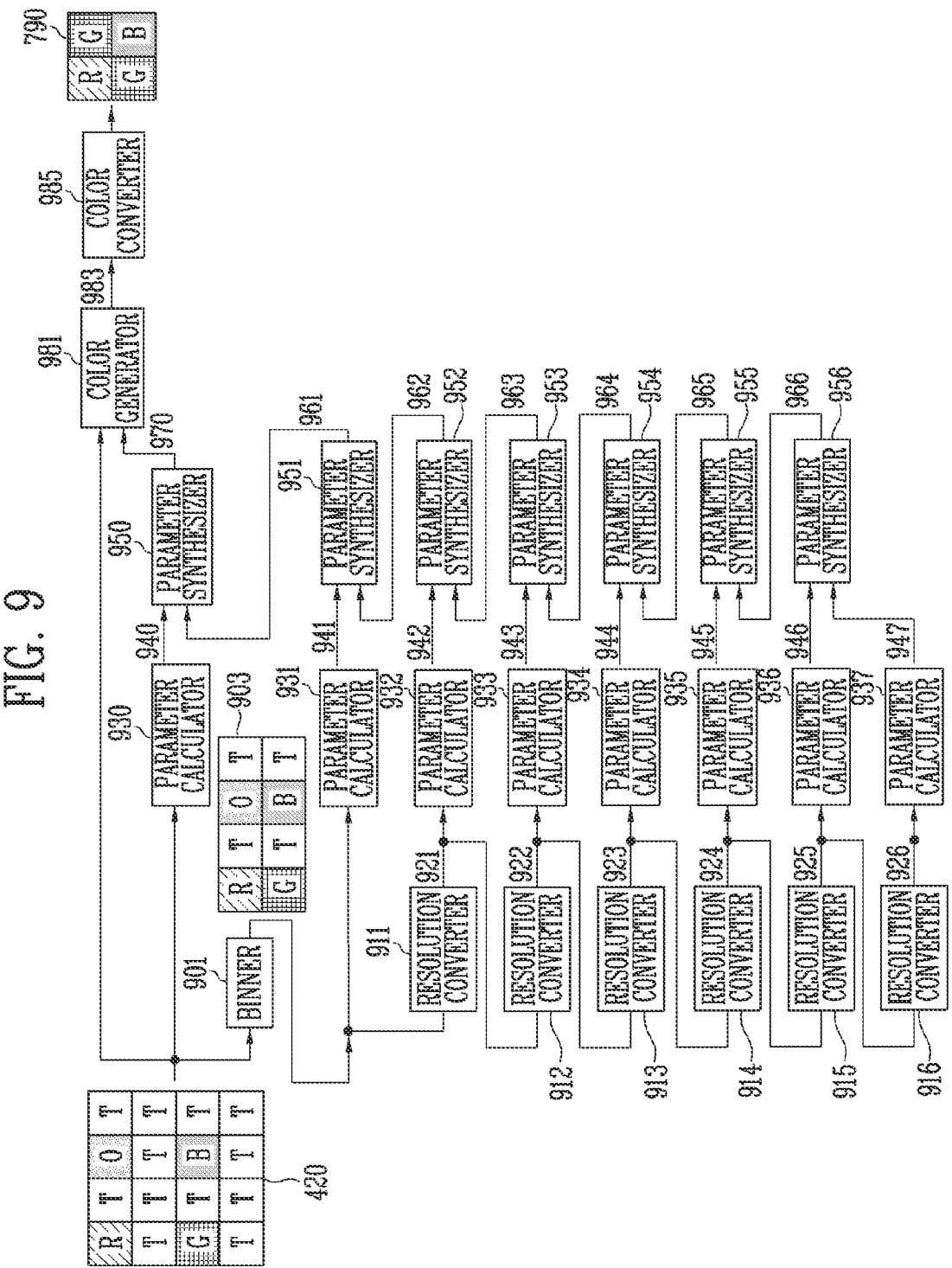
FIG. 9 is a diagram illustrating an example of the configuration of an image processor for acquiring an image in which noise is reduced using parametric images according to an embodiment of the present disclosure.

FIG. 9 is a diagram illustrating an example of the configuration of an image processor for acquiring an image in which noise is reduced using parametric images according to an embodiment of the present disclosure.

The image processor 200 may receive image data 420 from the image sensor 100 through the receiver 201. The image data 420 may correspond to image data 420, which is output from the image sensor 100 in a second mode, as illustrated in FIG. 4.

The image processor 200 may reduce the resolution of the image data 420 to ½ through a binner 901. For example, the binner 901 may maintain color pixel values included in the image data 420 without change, and may obtain binned image data 903 by summing or averaging texture pixel values in terms of three at a time.

The image processor 200 may perform resolution conversion, parametric image calculation, and parametric image synthesis based on the binned image data 903. Here, descriptions of the components used by the image processor 200 to acquire the synthesized parametric image 761 based on the image data 410 in FIG. 7, that is, the resolution converters 711, 712, 713, 714, 715, and 716, the images 721, 722, 723, 724, 725, and 726, the parameter calculators 731, 732, 733, 734, 735, 736, and 737, the parametric images 741, 742, 743, 744, 745, 746, and 747, the parameter synthesizers 751, 752, 753, 754, 755, and 756, the intermediate synthesized parametric images 766, 765, 764, 763, and 762, and the synthesized parametric image 761 may be equally applied to resolution converters 911, 912, 913, 914, 915, and 916, images 921, 922, 923, 924, 925, and 926, parameter calculators 931, 932, 933, 934, 935, 936, and 937, parametric images 941, 942, 943, 944, 945, 946, and 947, parameter synthesizers 951, 952, 953, 954, 955, and 956, intermediate synthesized parametric images 966, 965, 964, 963, and 962, and a synthesized parametric image 961 as components used by the image processor 200 to acquire the synthesized parametric image 961 based on the binned image data 903 in FIG. 9.

Therefore, among the components of FIG. 9, the remaining components to which the descriptions of FIG. 7 are not applied are described below. That is, the image processor 200 may acquire a parametric image 940 corresponding to image data 420 through a parameter calculator 930, and may acquire a synthesized parametric image 970 by synthesizing the parametric image 940 and the synthesized parametric image 961 through a parameter synthesizer 950.

Descriptions of the color generator 771, the RGBO image 772, and the color converter 773 of FIG. 7 may be equally applied to a color generator 981, an RGBO image 983, and a color converter 985.

Figure 10:
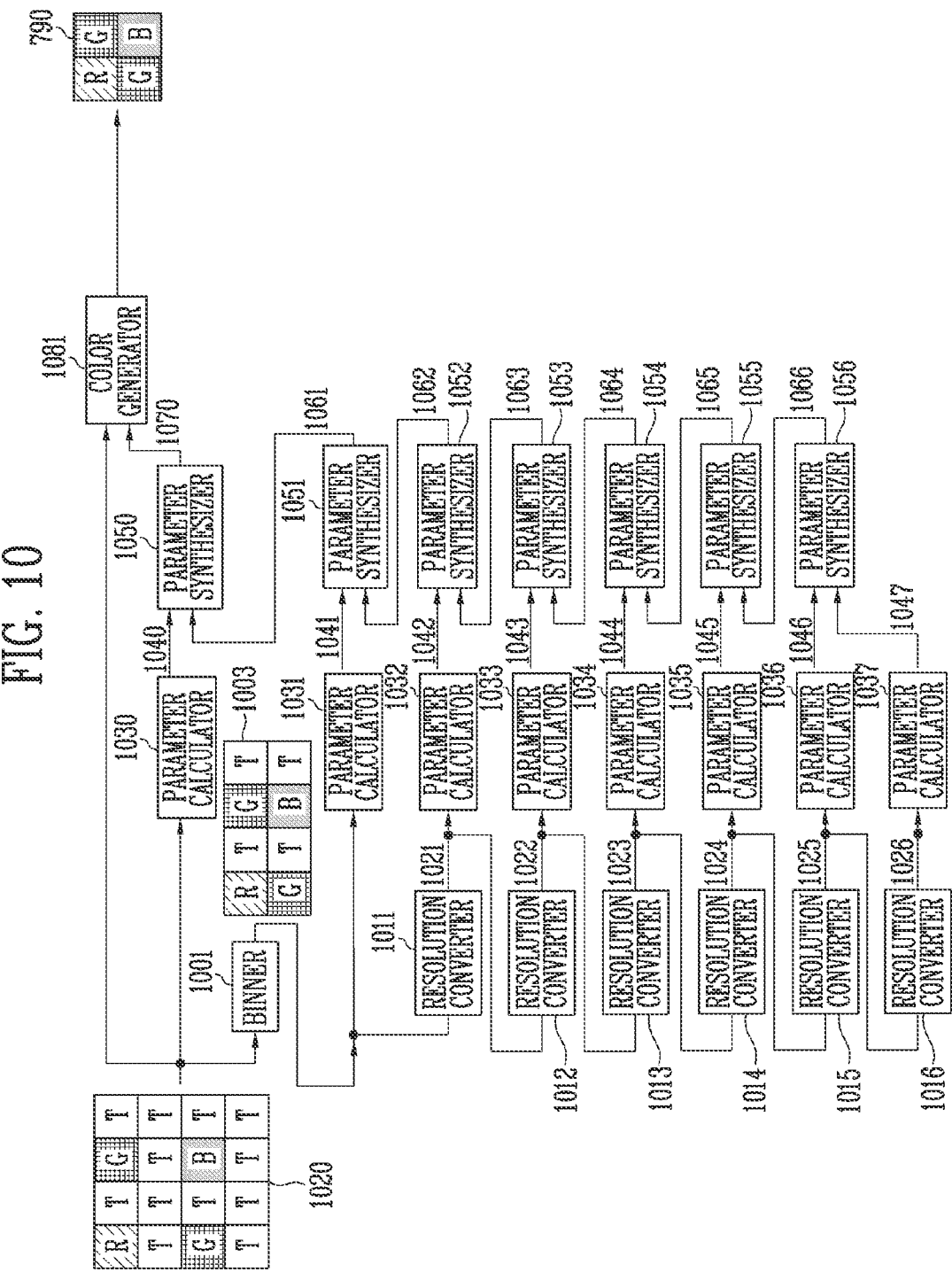
FIG. 10 is a diagram illustrating an example of the configuration of an image processor for acquiring an image in which noise is reduced using parametric images according to an embodiment of the present disclosure.

FIG. 10 is a diagram illustrating an example of the configuration of an image processor for acquiring an image in which noise is reduced using parametric images according to an embodiment of the present disclosure.

The image processor 200 may receive image data 1020 from the image sensor 100 through the receiver 201. When the image sensor 100 includes the pixel array 330 of FIG. 3 and is operated in a second mode, the image data 1020 output from the image sensor 100 may include R, G, and B color pixel values and texture pixel values, unlike the image data 420.

Descriptions of the binner 901, the binned image data 903, the parameter calculator 930, the parametric image 940, the parameter synthesizer 950, and the synthesized parametric image 970, which are illustrated in FIG. 9, may be equally applied to a binner 1001, binned image data 1003, a parameter calculator 1030, a parametric image 1040, a parameter synthesizer 1050, and a synthesized parametric image 1070, among the components illustrated in FIG. 10.

Further, descriptions of the components used by the image processor 200 to acquire the synthesized parametric image 861 based on the image data 410 in FIG. 8, that is, the resolution converters 811, 812, 813, 814, 815, and 816, the images 821, 822, 823, 824, 825, and 826, the parameter calculators 831, 832, 833, 834, 835, 836, and 837, the parametric images 841, 842, 843, 844, 845, 846, and 847, the parameter synthesizers 851, 852, 853, 854, 855, and 856, the intermediate synthesized parametric images 866, 865, 864, 863, and 862, and the synthesized parametric image 861 may be equally applied to resolution converters 1011, 1012, 1013, 1014, 1015, and 1016, images 1021, 1022, 1023, 1024, 1025, and 1026, parameter calculators 1031, 1032, 1033, 1034, 1035, 1036, and 1037, parametric images 1041, 1042, 1043, 1044, 1045, 1046, and 1047, parameter synthesizers 1051, 1052, 1053, 1054, 1055, and 1056, intermediate synthesized parametric images 1066, 1065, 1064, 1063, and 1062, and a synthesized parametric image 1061 as components used by the image processor 200 to acquire the synthesized parametric image 1061 based on the binned image data 1003, among the components illustrated in FIG. 10.

Therefore, among the components illustrated in FIG. 10, the remaining components to which the descriptions of FIG. 8 or 9 are not applied will be described below. That is, the image processor 200 may acquire an output image 790 using the synthesized parametric image 1070 and texture pixel values, included in the image data 1020, through a color generator 1081. It may be understood that the color generator 1081 is included in the image acquirer 240 of FIG. 5. Because the synthesized parametric image 1070 and the image data 1020 are irrelevant to an orange color, the color converter 985 may be omitted in FIG. 10, unlike FIG. 9.

The configurations of the image processor 200 illustrated in FIGS. 7 to 10 are examples of the device and method that are capable of reducing noise in images according to various embodiments of the present disclosure, and the scope of the present disclosure is not limited thereto.

According to an embodiment of the present disclosure, the electronic device may acquire images with high sharpness by decreasing an excessively blurred region while reducing noise contained in image data.

What is claimed is:

1. An electronic device, comprising:
   an image sensor configured to obtain image data including color pixel values and texture pixel values using color pixels and texture pixels;
   a resolution converter configured to generate two or more images having different sizes based on the image data;
   a parameter calculator configured to acquire two or more parametric images, respectively corresponding to the two or more images, using converted color pixel values and converted texture pixel values that are included in each of the two or more images;
   a parameter synthesizer configured to acquire a synthesized parametric image by synthesizing the two or more parametric images; and
   an image acquirer configured to acquire an output image based on the synthesized parametric image and the texture pixel values included in the image data.

2. The electronic device according to claim 1, wherein the resolution converter is configured to:
   convert a resolution of the image data and then acquire a first image having a reduced size compared to the image data, and
   convert a resolution of the first image and then acquire a second image having a reduced size compared to the first image.

3. The electronic device according to claim 2, wherein the parameter calculator is configured to:

acquire a first parametric image corresponding to the first image using first converted color pixel values and first converted texture pixel values that are included in the first image, and acquire a second parametric image corresponding to the second image using second converted color pixel values and second converted texture pixel values that are included in the second image.

4. The electronic device according to claim 3, wherein the parameter calculator is configured to obtain a first parameter value corresponding to a first point in the first parametric image by using first converted color pixel values and first converted texture pixel values that are included in a first region centered around the first point in the first image, among the first converted color pixel values and first converted texture pixel values that are included in the first image.

5. The electronic device according to claim 3, wherein the parameter synthesizer is configured to generate the synthesized parametric image based on the first parametric image for a partial region in which a number of textures equal to or greater than a certain level are present, and generate the synthesized parametric image based on the second parametric image for a remaining partial region.

6. The electronic device according to claim 1, wherein the image acquirer is configured to:
  obtain a function corresponding to the synthesized parametric image, and
  generate the output image by inputting a pixel position and a texture pixel value corresponding to the pixel position to the function.

7. The electronic device according to claim 1, wherein the image sensor includes, in each unit pixel arranged in a 2×2 array, one color pixel and three texture pixels, or two color pixels and two texture pixels.

8. The electronic device according to claim 7, wherein the image sensor is configured to:
  output one color pixel value and one texture pixel value in each unit pixel in a first mode, and
  output one color pixel value and three texture pixel values, or two color pixel values and two texture pixel values, in each unit pixel in a second mode.

9. The electronic device according to claim 1, wherein the image sensor comprises a pixel array and a color filter array, wherein the color filter array includes color filters, and
  wherein the pixel array includes the color pixels configured to receive light of a specific wavelength range transmitted through the color filters, and the texture pixels configured to receive light of a broader wavelength range without passing through the color filters.

10. The electronic device according to claim 1, wherein the resolution converter reduces a resolution of the image data to acquire a first image smaller than the image data, and further reduces a resolution of the first image to acquire a second image smaller than the first image.

11. An image processor, comprising:
  a receiver configured to receive image data including color pixel values and texture pixel values from an image sensor;
  a resolution converter configured to generate two or more images having different sizes based on the image data;
  a parameter calculator configured to acquire two or more parametric images, respectively corresponding to the two or more images, using converted color pixel values and converted texture pixel values that are included in each of the two or more images;
  a parameter synthesizer configured to acquire a synthesized parametric image by synthesizing the two or more parametric images; and
  an image acquirer configured to acquire an output image based on the synthesized parametric image and the texture pixel values included in the image data.

12. The image processor according to claim 11, wherein the resolution converter comprises:
  a first resolution converter configured to convert a resolution of the image data and then acquire a first image having a reduced size compared to the image data; and
  a second resolution converter configured to convert a resolution of the first image and then acquire a second image having a reduced size compared to the first image.

13. The image processor according to claim 12, wherein the parameter calculator comprises:
  a first parameter calculator configured to acquire a first parametric image corresponding to the first image using first converted color pixel values and first converted texture pixel values that are included in the first image; and
  a second parameter calculator configured to acquire a second parametric image corresponding to the second image using second converted color pixel values and second converted texture pixel values that are included in the second image.

14. The image processor according to claim 13, wherein the parameter synthesizer is configured to generate the synthesized parametric image based on the first parametric image for a partial region in which a number of textures equal to or greater than a certain level are present, and generate the synthesized parametric image based on the second parametric image for a remaining partial region.

15. The image processor according to claim 11, wherein the image acquirer is configured to:
  obtain a function corresponding to the synthesized parametric image, and
  generate the output image by inputting a pixel position and a texture pixel value corresponding to the pixel position to the function.

16. An image processing method, comprising:
  capturing image data including color pixel values and texture pixel values using color pixels and texture pixels that are included in an image sensor;
  generating two or more images having different sizes by converting the image data;
  acquiring two or more parametric images, respectively corresponding to the two or more images, using converted color pixel values and converted texture pixel values that are included in each of the two or more images;
  synthesizing the two or more parametric images to acquire a synthesized parametric image; and
  acquiring an output image based on the synthesized parametric image and the texture pixel values included in the image data.

17. The image processing method according to claim 16, wherein generating the two or more images having different sizes comprises:
  converting a resolution of the image data and then acquiring a first image having a reduced size compared to the image data; and
  converting a resolution of the first image and then acquiring a second image having a reduced size compared to the first image.

18. The image processing method according to claim 17, wherein acquiring the two or more parametric images comprises:
  acquiring a first parametric image corresponding to the first image using first converted color pixel values and first converted texture pixel values that are included in the first image; and
  acquiring a second parametric image corresponding to the second image using second converted color pixel values and second converted texture pixel values that are included in the second image.

19. The image processing method according to claim 18, wherein synthesizing the two or more parametric images to acquire the synthesized parametric image comprises:
  generating the synthesized parametric image based on the first parametric image for a partial region in which a number of textures equal to or greater than a certain level are present, and generating the synthesized parametric image based on the second parametric image for a remaining partial region.

20. The image processing method according to claim 16, wherein acquiring the output image comprises:
  obtaining a function corresponding to the synthesized parametric image; and
  generating the output image by inputting a pixel position and a texture pixel value corresponding to the pixel position to the function.

* * * * *